June 10, 1958  W. L. SPITZER  2,837,938
WATCHMAKER'S DRILL PRESS FOR USE WITH A LATHE
Filed March 7, 1957
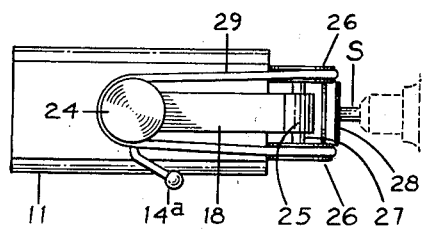
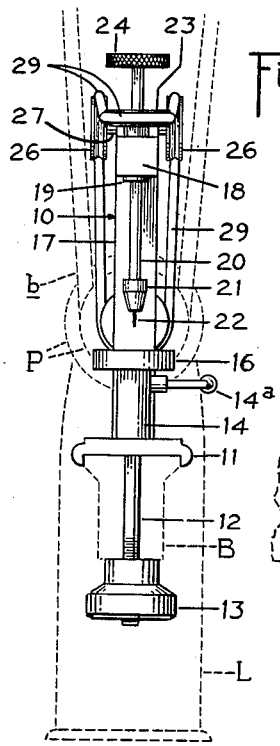
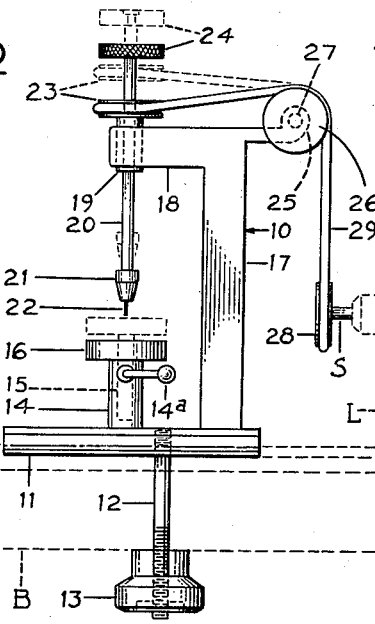
WILLIAM L. SPITZER
INVENTOR.

United States Patent Office 2,837,938
Patented June 10, 1958

2,837,938

WATCHMAKER'S DRILL PRESS FOR USE WITH A LATHE

William L. Spitzer, Warrensburg, Ill.

Application March 7, 1957, Serial No. 644,673

2 Claims. (Cl. 77—5)

This invention relates to a watchmaker's drill press for use with a lathe.

A primary object of the invention is to provide a watchmaker's drill press which is adapted for expeditious operative association with a lathe and which is characterized by novel drive means adapted for operative connection with the drive means of the lathe.

A further object of the invention is a manually controllable drill shaft embodied in the drill press.

A still further object of the invention is the provision of a drill press characterized by an adjustable work support whereby the press is adapted to accommodate various sizes of work being operated upon.

Other objects and advantages of the invention will become apparent in the course of the following detailed description, taken in connection with the accompanying drawing, wherein—

Fig. 1 is a side elevational view of the drill press in accordance with a preferred structural embodiment thereof, and wherein same is shown in operative association with a lathe, indicated in dotted lines.

Fig. 2 is a front elevational view of the drill press with portions of the lathe indicated in dotted lines.

Fig. 3 is a top plan view of the drill press.

Referring now in detail to the drawing by use of reference characters, the improved drill press comprises a frame 10 which includes a slidable track base member 11 which is supportable on the lathe bed B by means of a vertical bolt 12 extendible through said lathe bed and being provided with a nut 13 which is engageable with the lower face of the said lathe bed.

The base member 11 is provided with a tubular mount 14 which projects upwardly therefrom and in which is vertically adjustably supported a shaft 15 whose upper end rigidly supports a drill table 16.

The tubular mount 14 is provided with a locking handle 14a by which the said shaft 15 is locked in any desired vertical position with a corresponding adjustment of the work supporting table 16, as is indicated by dotted lines in Fig. 1.

The frame 10 further includes a vertical upright 17 which, as indicated in Fig. 1, projects upwardly from one end of the base member 11, and the upper end of the upright 17 is provided with a horizontal portion 18 in which is disposed a vertical bearing member 19 for a drill shaft 20 which is rotatable and also vertically slidable in the bearing member.

The shaft 20 is provided on its lower end with a drill chuck 21 which removably supports a drill bit 22.

The drill shaft 20 has fixed thereto a V-type pulley 23 and the upper end of the shaft has rotatably supported thereon a knurled disc 24.

The said horizontal portion 18 is extended to the side of upright 17 opposite the drill shaft 20 in the form of a lug 25 on the opposed sides of which are rotatably supported a pair of V-type pulleys 26 by means of a shaft 27.

The lathe L includes a plurality of different diameter pulleys P which as usual are selectively driven by a belt b and the said pulleys p are fixed to a shaft S which for the purpose of the present invention is provided with a V-pulley 28.

A round belt 29 extends about the several pulleys 23, 26 and 28 and which through rotation of the lathe shaft S impart rotation to the drill press shaft 20.

In operation of the improved drill press, as above described, the table 16 is vertically adjusted for support of a piece of work of predetermined size. The lathe is then set into operation with a resulting rotation of its shaft S and through the pulleys 23, 26 and 28, the drill press shaft 20 is set into rotation.

The operator controls the shaft 20 vertically by his fingers which engage the knurled disc 24 in which the upper end of the shaft 20 is rotatable whereby the bit 22 may be pressed to the work in a drilling operation or raised therefrom upon completion of a drilling operation.

Having set forth my invention in accordance with a preferred structural embodiment thereof, what I claim and desire to secure by U. S. Letters Patent is—

1. A drill press comprising a frame including an elongated horizontal base member engageable with the horizontal bed of a lathe, a vertically disposed bolt depending from said base member and extendable through said bed, a nut on the lower end of said bolt for engaging said bed for holding said frame in operative position, said frame further including a vertical upright member disposed at one side of said bolt, a tubular mount extending vertically upwardly from said base member at the other side of said bolt, a work supporting table vertically adjustably supported by said mount, a frame portion projecting horizontally from the upper end of said vertical upright member with the free end thereof overhanging said work supporting table, a vertical bearing in said free end of said horizontal frame portion in coaxial relation to said mount, a drill shaft supported in said bearing for rotation about its axis and for movement along said axis, a finger engageable knurled disc rotatably mounted on the upper end of said drill shaft, and belt engaged pulleys supported by said frame and said shaft for effecting rotation of said shaft from a horizontal axis belt engaged drive pulley on said lathe.

2. The structure according to claim 1, wherein said frame further includes a lug projecting horizontally from the upper end of said vertical upright in opposition to said horizontal frame portion, and said pulleys comprising a pair thereof of which one is rotatably supported on each side of said lug on a horizontal shaft extending through the lug.

References Cited in the file of this patent

UNITED STATES PATENTS

| | | |
|---|---|---|
| 336,849 | Frech | Feb. 23, 1886 |
| 556,182 | Grady | Mar. 10, 1896 |
| 572,243 | Brooks | Dec. 1, 1896 |
| 1,574,571 | Gray | Feb. 23, 1926 |
| 2,222,538 | Maynard | Apr. 25, 1938 |
| 2,784,752 | Emrick | Mar. 12, 1957 |

FOREIGN PATENTS

| | | |
|---|---|---|
| 427,685 | Great Britain | Apr. 29, 1935 |